C. S. & C. D. Cannon,
Ladder.
No. 106,996.    Patented Sep. 6, 1870.
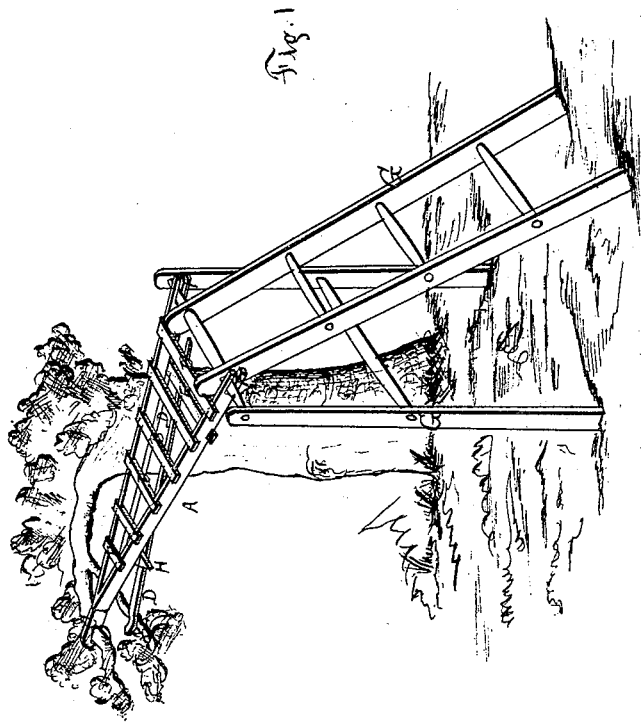
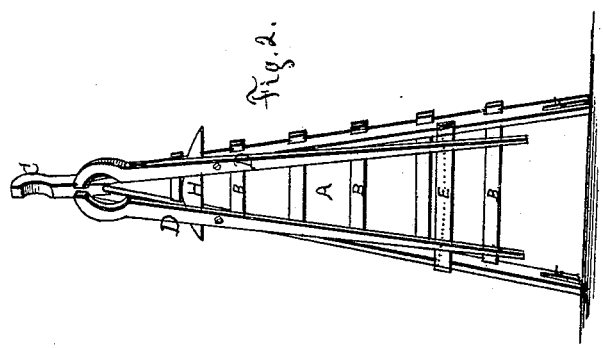
WITNESSES.
E. H. Frost.
C. J. Powers
INVENTORS.
C. S. & C. D. Cannon.
By Farwell, Ellsworth & Co
Attorneys.

UNITED STATES PATENT OFFICE.

CORODON S. CANNON AND CLINTON D. CANNON, OF CHICAGO, ILLINOIS.

IMPROVEMENT IN FRUIT-LADDERS.

Specification forming part of Letters Patent No. 106,996, dated September 6, 1870.

*To all whom it may concern:*

Be it known that we, CORODON S. CANNON and CLINTON D. CANNON, of Chicago, in the county of Cook and State of Illinois, have invented a new and useful Fruit-Bridge; and we do hereby declare the following to be a full, clear, and exact description thereof, which will enable others skilled in the art to which our invention appertains to make and use the same, reference being had to the accompanying drawing, forming part of this specification.

Figure 1 is a perspective view of the fruit-bridge in position for use upon a tree, and Fig. 2 is a bottom-plan view of the same.

Similar letters of reference indicate corresponding parts in the several figures of the drawing.

Our invention has for its object to facilitate the gathering of fruit; and to this end it consists in a bridge so constructed that one end shall catch over and hold upon the limb of a tree, while the opposite end is secured to an upright or rests upon the ground.

When applied to an upright it occupies a horizontal position beneath the limb of the tree, and forms a portable platform from which the fruit to be gathered can be reached upon a number of different limbs or upon one entire side of a tree.

In the accompanying drawing, A is a triangular frame, provided with the lateral strips or bars B, and at the upper end or the angle formed by its two longer sides with a projecting hook, C. The bars B are placed at such a distance from each other as to form a series of steps when the frame is placed in an upright position. D D are levers pivoted to the under side of the frame A, and extending nearly the whole length of the same. Their forward ends are bent or curved to form hooks, and their rear ends are provided with pins adapted to fit within a series of holes formed in the cross-bar E of the frame.

When the frame is to be used as a bridge the hook C is caught over the limb of a tree, as shown in Fig. 1, and the notches F in the ends of the side bars are fitted upon a round affixed to and forming the upper end of a supporting-horse, G. By these means the bridge is held in a horizontal position beneath the tree and within easy reach of the limbs.

To prevent the hook C from turning upon the limb, and also to prevent its lateral movement, one or the other of the levers is adjusted so that its hook shall catch upon any projecting limb within the limit of its movement. The limb is then drawn toward the frame, and the lever locked in place by means of the pins and the holes in the cross-bar E, previously mentioned.

The forward end of the hooked levers are supported when thrown outward by means of the segmental block or strip H, secured to the under side of the frame and projecting upon each side thereof. By this arrangement a platform or bridge is formed beneath the tree capable of sustaining the weight of several persons within easy reach of the fruit to be gathered.

When the bridge is to be used as a ladder it is removed from the supporting-hooks and placed in an upright position, either against a tree or with its hook C caught over a limb.

The hooked levers may be either closed under the frame or caught over projecting limbs, as above mentioned.

Having thus described our invention, what we claim as new, and desire to secure by Letters Patent, is—

1. The fruit bridge or ladder consisting of the triangular frame provided with the hook C, cross-bars B, and adjustable hooked levers D, substantially as described, for the purpose specified.

2. The fruit bridge or ladder, constructed as described, for the purpose specified.

CORODON S. CANNON.
CLINTON D. CANNON.

Witnesses:
G. H. FROST,
D. I. POURIS.